United States Patent [19]

Johnson

[11] Patent Number: 4,600,355
[45] Date of Patent: Jul. 15, 1986

[54] MODULAR ROBOTICS SYSTEM WITH BASIC INTERCHANGEABLE PARTS

[75] Inventor: Roger F. Johnson, Kent, Wash.

[73] Assignee: Cybot, Inc., Kirkland, Wash.

[21] Appl. No.: 646,320

[22] Filed: Aug. 29, 1984

[51] Int. Cl.$^4$ .............................................. B25J 9/08
[52] U.S. Cl. ........................ 414/680; 248/558; 403/3; 414/730; 434/401; 446/90; 901/9; 901/15; 901/21; 901/25; 901/28
[58] Field of Search ............. 414/722, 727, 735, 730, 414/680; 901/15, 21, 23, 25–29, 45, 47, 50, 9; 403/3, 4; 248/558, 674; 446/424, 425, 426; 434/370, 219, 293, 401; 446/90, 102, 103, 104

[56] References Cited

U.S. PATENT DOCUMENTS

| | | | |
|---|---|---|---|
| 2,933,205 | 4/1960 | MacDonald et al. | 901/29 X |
| 2,949,323 | 8/1960 | Moorhead | 403/4 X |
| 4,370,091 | 1/1983 | Gagliardi | 414/4 X |
| 4,496,278 | 1/1985 | Kaise | 414/735 |
| 4,502,830 | 3/1985 | Inaba et al. | 901/21 X |
| 4,529,460 | 7/1985 | Hasegawa et al. | 414/722 X |

FOREIGN PATENT DOCUMENTS

| | | | |
|---|---|---|---|
| 0086237 | 8/1983 | European Pat. Off. | 901/29 |
| 56-53561 | 5/1981 | Japan | 248/674 |
| 763082 | 9/1980 | U.S.S.R. | 414/735 |

Primary Examiner—Donald W. Underwood

[57] ABSTRACT

A modular, multi-configuration robotics system having basic interchangeable component parts including a base (10), turret (110), rails (20), mounting blocks (30), motors (80), arm links (60) as the primary components and also including bearings (180), pillow blocks (170), gears (176, 178), various shafts, pulley, belts, electronic controller and optical encoders (184) as additional essential component parts. The system is intended as a tutorial device in the field of educational robotics.

17 Claims, 14 Drawing Figures

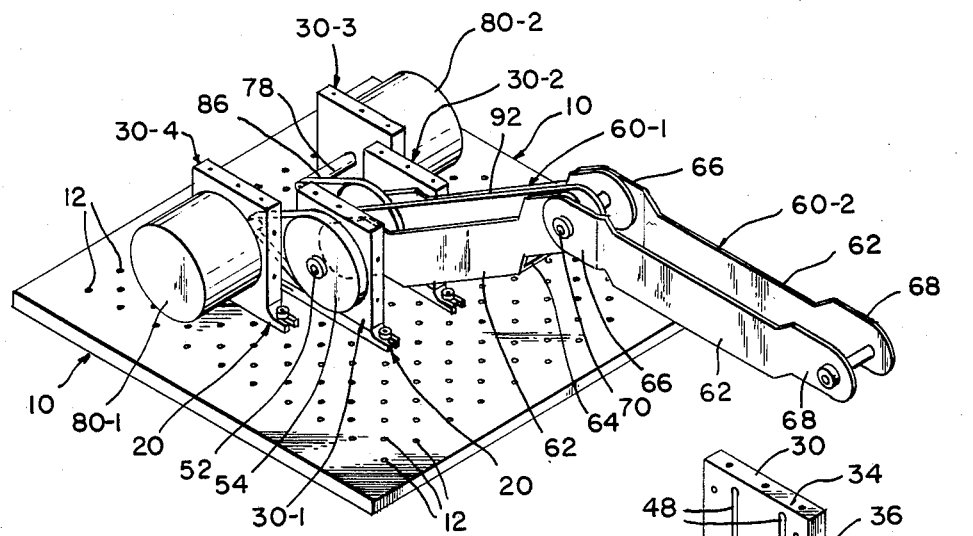

MODULAR ROBOTICS SYSTEM WITH BASIC INTERCHANGEABLE PARTS

TECHNICAL FIELD

This invention relates to the field of robotics and, more particularly, to an educational robotics system utilizing basic modular interchangeable parts for constructing robots and several configurations which have varying degress of complexity and capability.

BACKGROUND ART

As those skilled in the field of educational robotics are aware, most of the available tutorial or educational robots available on the market is a single configuration device such that the educational advantage therein is limited primarily to teaching how to program and thus control a robot arm. Since technical education will more and more include courses in robotics, with emphasis on all fields of robot kinematics, dynamics, design, programming, and applications, the single configuration units will simply lack the versatility, flexibility and thoroughness to which students should have access. To applicant's knowledge, none of the known devices utilizes modular, interchangeable parts which enable one to construct robots of from two through five articulations or axes.

No attempt will be made here to discuss the differences in the several types of robot anatomy or construction. Whether they are limited sequences robots, playback robots with point-to-point control or playback robots with continuous path control is of no concern within this patent application. Essentially, however, robots used for educational purposes are of the playback type with point-to-point control and thus there is required knowledge on the part of the control programmer that when the robot is commanded to move from one position to another, there could be involved independent operation of two or more of its articulations. The only information which the robot receives from its controls is to be taught the attitude of the limbs at the start of the move and the new attitude of those limbs when the particular move has been finished. While making the move as rapidly as it can, and while moving all limbs simultaneously if required to fulfill the given command, there is no definition of the paths which the robot limbs will trace. Thus, the control is point-to-point allowing some flexibility in the program control by which the various points are reached.

Various types of robot geometry are available depending upon the application or needs. As those skilled in the art are aware, the robot, depending on its mechanical design, may operate to mathematical advantage in (1) Cartesian coordinates, (2) Cylindrical coordinates, (3) Polar coordinates, or (4) Combinations thereof. Each of these configurations offers a different shape to the robots envelope volume or sphere of influence. Again, for different applications, different configurations may be appropriate and software can make possible transformations from one coordinate system to another. In every case, the arm carries a wrist assembly to orient its end effector as demanded by the application or goal in mind.

It is not uncommon for the wrist of the robot arm to provide three articulations or motions labeled pitch, yaw and roll. It will be noted that the various arm coordinate systems require three articulations to deliver the wrist assembly anywhere in the sphere of influence or envelope. It then requires three more articulations in the wrist for univeral orientation of the end effector. However, and quite often, robots are able to cope with job assignments without employing a full set of six articulations. Generally, five articulations are adequate since, for instance, yaw articulation in the end effector may not be necessary.

Among the prior art are four U.S. patents, none of which is seen upon close analysis to be material to the instant invention and thus are only of interest. They are U.S. Pat. Nos. 3,888,362; 3,066,805; 4,068,763; and 4,109,398. Applicant knows of no other pertinent or material references.

DISCLOSURE OF INVENTION

The invention comprises a system of modular construction units which can be assembled into configurations consisting of one through five articulations. The fives axes configuration, for example, may be assembled into a more complex and sophisticated five axes revolute robot. The invention includes a base plate with a grid of threaded holes for receiving rail members and/or mounting blocks which in turn support drive motors, pillow blocks, shafts, bearings, gears, pulleys and belts, and/or combinations thereof including an optical encoder feedback unit. As stated above, the basic modular units including the base plate may be assembled from the simple two axis configuration up to the more complex and sophisticated five axis revolute robot which includes a turret and motor driven pinion for rotating the turret.

Accordingly, it is among the numerous features and advantages of the invention to provide a multi-configuration, modular and interchangeable part system for building tutorial or educational-type robot arms. The system is such that the arm may have from two to four joints or links in the arm. The system enables the construction of a number of configurations of robot and thus it is technically a more versatile and more useful tool for teaching the technology and science of robotics. Because the system is modular and interchangeable, students are able to learn more about how robotics work in addition to learning to program robotic arms. Thus, the teaching is more thorough and provides robotic education in greater depth. The system teaches not only robot kinematics, dynamics and design but it also enables the teaching of robot control programming. Students will learn control of articulated limbs and joints up to and including a five axis revolute assembly with one degree of freedome at a time. The system will enable the teaching of inertia, torque, forces, kinematics, tactile force and position feedback and the use of end effectors and to program the degrees of control. The block and rail basic units serve multiple functions and structural purposes in the system. The system is versatile, flexible and therefore much more useful as a tutorial and educational tool. Though the system can be said to have an erector set analogy, it is as stated above, clean and flexible and enables the student to learn by actually building and therefore learning the structural and control aspects of robotics.

BRIEF DESCRIPTION OF DRAWINGS

FIG. 1 is a view in perspective showing one of the simplest configurations of a robot arm in a two axis configurations and attached to a non-moving base;

FIG. 2 is a side elevation of the configuration of FIG. 1 showing additional details thereof;

FIGS. 6 and 7 show two arrangements or in which basic block units may be joined to each other;

BEST MODE FOR CARRYING OUT THE INVENTION

Figure 9:
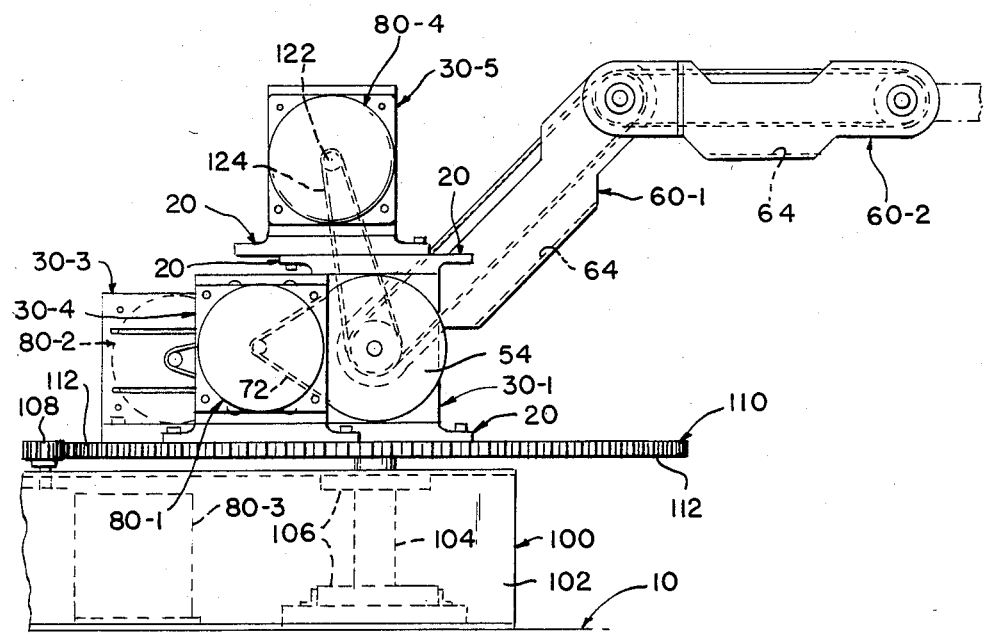
FIG. 9 is a side elevation view of a five axis configuration of the system showing the manner of combining basic modular structural units.
Figure 10:
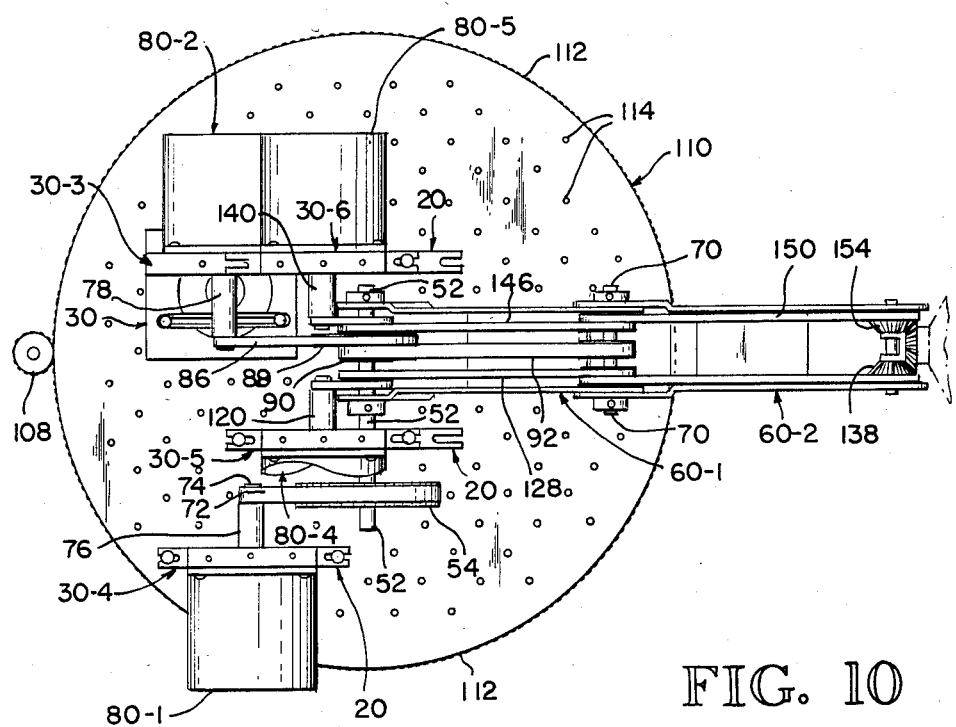
FIG. 10 is a top plan view of the configuration of FIG. 9.
Figure 11:
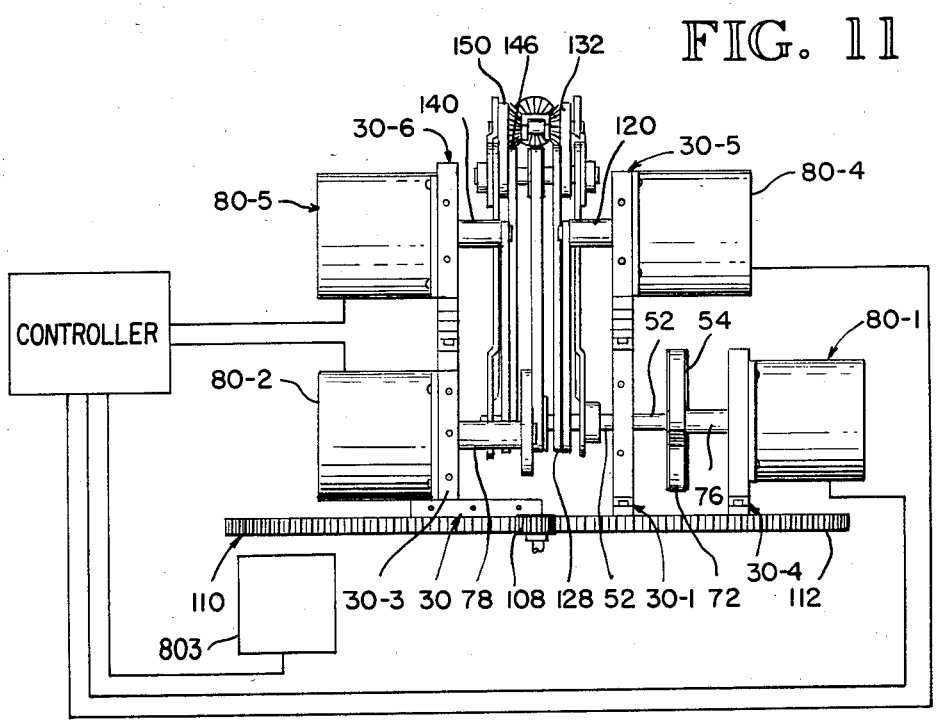
FIG. 11 is a rear elevation view showing additional details of the manner of combining modular components for the configuration of FIG. 9.

Referring now to the drawings, it will be seen that FIGS. 1, 2, 3 and 4 show a simple two axis embodiment or configuration utilizing the modular component parts of this invention and that FIGS. 9, 10 and 11 show a more complex and sophisticated embodiment or configuration made from the component parts of the invention.

FIGS. 1, 2, 3, and 4, show that a first component modular part is the base plate generally designated by the number 10 and having therein a number of threaded holes 12 which are formed in two rows at 90 degrees to each other on one inch centers. Base plate 10 is preferably formed of aluminum plate of approximately ⅜ to ½" in thickness and approximately 18" to 2' square.

Figure 5:
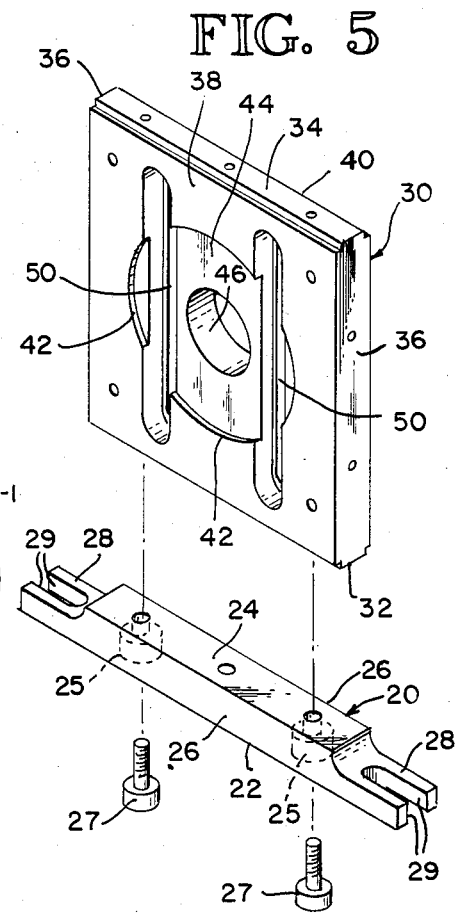
FIG. 5 is an exploded view of the rail and block which forms two of the back modular construction components.
Figure 8:
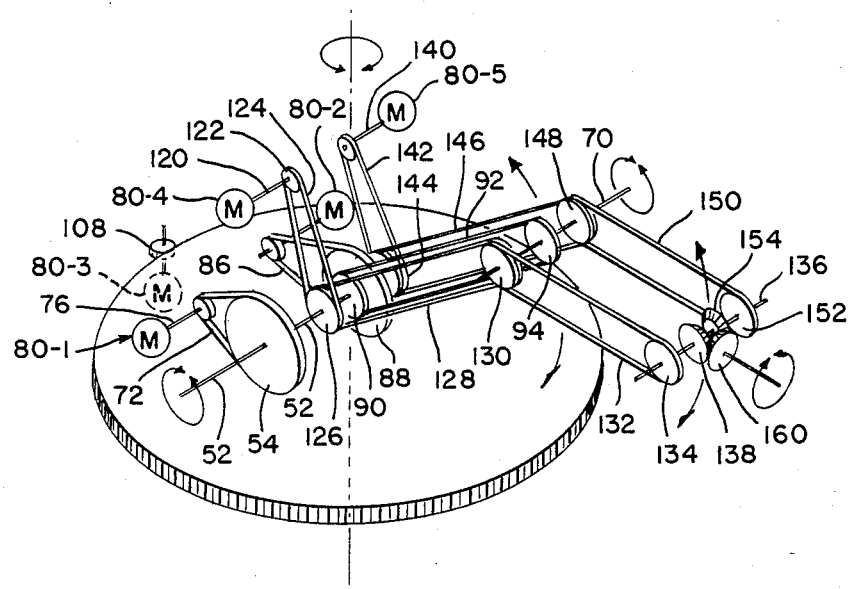
FIG. 8 is a kinematic power train diagrammatic showing as simply as possible the transfer of power to the robot components.

FIGS. 5, 6 and 7 show details of two of the basic components in the system. Besides the base plate 10, the next modular component part is the rail member 20 which has a flat bottom mounting surface 22, a top mounting surface 24 and side surfaces 26. As is shown in FIG. 5, the rail has a rectangular cross-section with the end portions 28 notched as at 29 to receive mounting screws for attaching the rail to a mounting surface. The end portions 28 are cut downwardly and outwardly from the top mounting surface 24 so that the heads of the screws will not interfere with the mounting of blocks on the rails. In this way, the top mounting surface 24 is raised above the end portions 28 and is generally centrally disposed.

FIGS. 5, 6 and 7 also show the verstility of the basic mounting block unit generally designated by the number 30. Block 30 is approximately ⅜" thick, measures approximately 2½ inches by 2¼ inches and can be seen to be essentially rectangular in shape. The block has bottom mounting edge 32, top mounting edge 34, side mounting edges 36 and first mounting surface 38 and second mounting surface 40. The first surface 38 has circular depression or inwardly offset surface 42 which defines the flat or planar surface 44 in the block. A centrally disposed opening 46 of substantially less diameter than inwardly offset surface 42 is provided in the center of the block. Spaced between the center opening 46 and side edges 36 of the block are slots 48 which are generally parallel with each other and with the side edges 36 and which extend from near the upper and lower mounting edges 32 and 34. Slots 48 are provided on the first surface with countersunk recesses to define shoulders 50 extending entirely around the slot. Only the slot itself opens through to the second surface 40 but on the first surface the recesses with shoulders 50 are provided so that again, the heads of the screws do not project out and interfere with assembling the component parts.

FIGS. 5, 6 and 7 show that mounting of a block on a rail is accomplished by first attaching the block either by its upper or lower mounting edge on the mounting portion 24. Standardized screws 27 are used and inserted into countersunk screw openings 25 and then received into appropriate threaded holes in the mounting edge 32 of the block for securing the rail 20 and block 30 together. After the rail and block are joined, the rail is then by screws 27 extending downwardly into selected threaded holes in the supporting surface 10 firmly anchored in place.

In like manner, as shown in FIGS. 6 and 7, a block may be mounted on a block by one side edge or on a surface. The horizontal block is then secured to the base surface.

It will be appreciated that the various holes on the edges and faces of the blocks and on the mounting surfaces of the rails are standardized threaded taps on predetermined centers. The upper and lower mounting edges of the block show three threaded openings while the side edges 36 show two threaded openings all of which are on predetermined centerline measurements. Additionally, threaded taps are provided through the block near each of the four corners.

Figure 3:
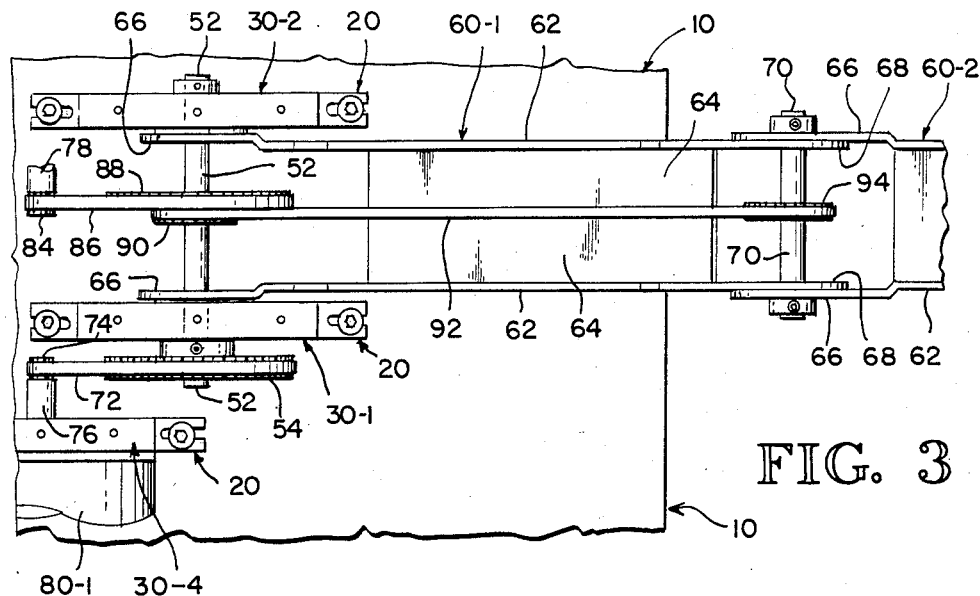
FIG. 3 is a partial top plan view of the configuration of FIG. 1 showing additional details of the modular units used in the construction.
Figure 4:
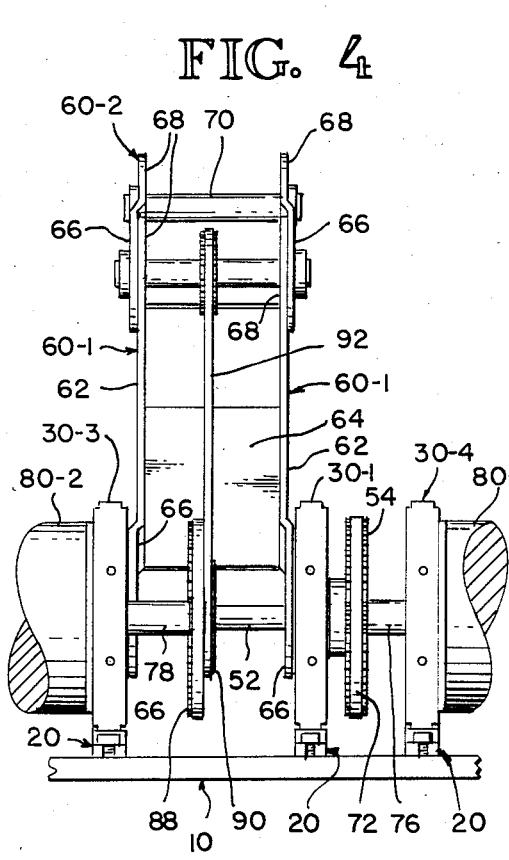
FIG. 4 is a rear elevation view showing additional details of the configuration of FIG. 1.

Referring now more specifically to FIGS. 1, 2, 3, and 4, it will be observed that blocks and rails have been secured together and mounted on the base surface 10 to provide a basic support structure for the arm links. Blocks 30-1 and 30-2 are provided with a shaft 52 which is received in bearings (not shown) which are received in the central openings 46 of blocks 30-1 and 30-2 and which shaft 52 extends out of the opposite face of block 30-1 to receive pulley 54. The spaced blocks 30-1 and 30-2 provide the support for first arm link 60-1 which is a U-shaped trough member having side walls 62 and interconnecting bottom wall 64. With the open side of the arm facing upwardly, belts as needed may extend through the trough of the arm or arms between pulleys. An inner yoke or connector end 66 is spread slightly by an outward offset. The outer end 68 is of the same spacing as side walls 62 so that the outer end 68 of link arm 60-1 fits inside the yoke portion 66 of arm 60-2 as seen in FIGS. 1, 2, and 3. The yoke end 66 of arm 60-2 together with outer end 68 of arm 60-1 is mounted on connecting shaft 70. It will be appreated that the end effector is not shown in FIGS. 1-4 but will be included in description with respect to the configuration shown in FIGS. 8-11.

Link arm 60-1 is driven by the pulley 54, belt 72 and small pulley 74, the large pulley being fixed to shaft 52. Motor 80-1 is mounted on block 30-4 and has shaft 76 driving small belt pulley 74 which transmits rotational force through belt 72 to pulley 54 which is as stated above, fixed to shaft 52. It will be appreciated that the yoke end 66 of link arm 60-1 is fixed to shaft 52 so that by energization of motor 80-1, link arm 60-1 may be raised or lowered around its pivot center 52.

Link arm 60-2 is driven by motor 80-2 mounted on block 30-3. The motor shaft of motor 80-2 drives pulley 84 which through belt 86 drives larger pulley 88 which idles on shaft 52. Fixed to pulley 88 is small pulley 90 which through belt 92 drives pulley 94 secured to the intermediate shaft 70 for pivotal movement of the outer arm. It will be appreciated that end 66 of arm 60-2 is secured to shaft 70 as is pulley 94. Thus, upon actuation of the motor through the pulley and belt power transmission train, the outer arm 60-2 may be raised and lowered independently of the first arm 60-1.

It is to be understood that the stepper motors 80-1 and 80-2 and others which will be utilized are all of a standard make so that with proper controls, very precise positioning of the arms may be attained. It will also be appreciated that gears may be used in place of belts and pulleys for some of the power transmission as will be understood upon the further description of the more sophisticated configuration which follows.

FIGS. 8 through 11 are directed to a five axis configuration of a robot utilizing the modular component parts which have so far been discussed. It is to be understood that 3 and 4 axis robots may also be assembled. Base plate 10 in this configuration is utilized to support a motor drive and turret support assembly generally designated by the number 100. The assembly includes a housing 102, turret shaft 104 supported in bearing structure 106, and a turret drive stepping motor 80-3 which drives pinion gear 108 which protrudes from the housing just above the top of housing 108. Turret 110 is supported on the turret shaft 104 and contains teeth around the full 360 degress of its edges 112 with which it engages pinion 108. FIG. 10 shows that turret plate 110 is also provided with a predetermined pattern of standard threaded holes 114 to which the basic component parts, such as rails and mounting blocks may be attached by standard sized screws 27. The turret establishes vertical axis of rotation for the robot arm and end effector attached thereto.

The five axis configuration of FIGS. 8 through 11 begins with establishing and building from the configuration shown in FIGS. 1 through 4. Thus, rails 20, instead of being secured to the base 10, are attached to turret 110, where again blocks 30-1 and 30-2 receive and support shaft 52 in bearings in the central openings rthereof. Also, mounting blocks 30-3 and 30-4 can be seen to be in essentially the same position as with the simpler configuration except that mounting block 30-3 has been mounted on another block 30 instead of a rail 20, as can best be seen in FIGS. 10 and 11. To illustrate the versatility of the system, mounting blocks 30-5 and 30-6 are seen to be mounted atop blocks 30-1 and 30-2 to support stepping motors 80-4 and 80-5. FIG. 9 shows that in order to more conveniently construct the unit, the two bottom surfaces of two rails 20 have been offset longitudinally on the tops of blocks 30-1 and 30-2 to conveniently support the upper support blocks 30-5 and 30-6. Motors 80-4 and 80-5 drive the belt and pulley trains for power to the end effector to affect pitch and roll through the use of a bevel gear differential. Upper motor 80-4 through its shaft 120 drives pulley 122 and belt 124, which in turn drives pulley 126 located on shaft 52. Pulley 126 through belt 128 drives pulley 130 located on the shaft 70 linking firm arm 60-1 and second link arm 60-2. Pulley 130 through belt 132 to pulley 134 located on shaft 136 at the outer end of arm 60-2 drives bevel gear 138.

In like manner, motor 80-5 through shaft 140 and belt 142 to pulley 144 mounted on shaft 52 and thence via belt 146 drives pulley 148 on shaft 70 between the two arms. From pulley 148 through belt 150 power is transferred to the pulley 152 which in turn drives bevel gear 154.

At the end of arm 60-2, the wrist of the end effector, gripper or jaws will be attached with a bevel gear 160 which connects to bevel gears 138 and 154.

As has been previously explained, motor 80-1 through pulley 54 mounted on shaft 52 pivots the first link arm 60-1. Motor 80-2 through pulleys 88 and 90 and shaft 70 pivots arm 60-2. The drive trains of belts and pulleys from motors 80-4 and 808-5 which drive bevel gears 138 and 154 impart either a pitch motion or a roll motion to the wrist assembly for the end effector. If one bevel gear is turned one direction, the other bevel gear is turned the opposite direction the motion imparted to the wrist is purely rotary or roll articulation. If the two bevel gears 138 and 154 are turned in the same direction by their control motors, then a pitch motion or articulation of the end effector through the wrist is imparted. If the two bevel gears are rotated at different speeds in opposite directions or in the same direction, the movement of the wrist assembly or end effector will be a combination of roll and pitch articulation. Such a device which allows two orthogonal outputs, i.e. pitch and roll, is commonly referred to as a differential.

As shown, it is not possible to impart a yaw articulation to the end effector without additional power transfer and another pivot for the end effector.

Figure 12:
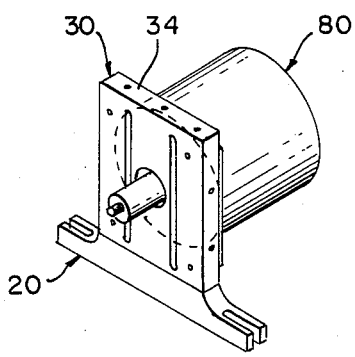
FIG. 12 shows the rail and block combination as a motor mount.
Figure 13:
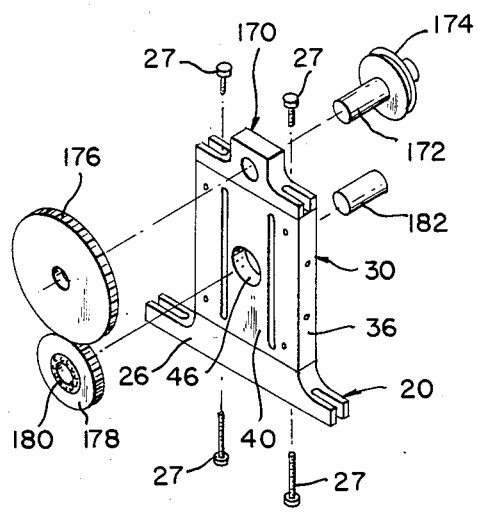
FIG. 13 shows the basic block and rail modules configured as a transmission using a bearing support.
Figure 14:
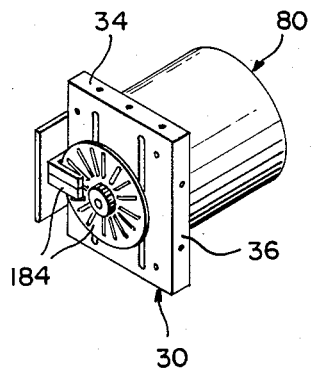
FIG. 14 is a perspective view showing a block not only as a motor mount but as a optical encoder feedback module.

FIGS. 12 through 14 have been included to show the block as a motor mount for motor 80. FIG. 13 shows a block 30 as being a mount for pillow block 170 which in turn will accommodate a shaft 172 on which may be mounted a belt pulley 174 or on which shaft 172 may be mounted a gear 176. Another gear 178 is shown to be mounted on a bearing 180 though the bearing 180 may be in the opening 46 of the mounting block 30 to accommodate a shaft 182. The combination of interlocking and interchangeable parts enables a substantial amount of versatility in the manner in which the robot is powered. Accordingly, gears such as 176 and 178 may be utilized in certain of the drive areas or the belt and pulley combinations as shown in the drawings of the two illustrated configurations may be employed.

FIG. 14 shows an optical encoder unit which can be fitted on the mounting block 30 in order to better allow for control of a particular articulation for the robot. The optical encoder sends direction signals to the control unit which indicates how far and in what direction a stepper motor has moved. It can be the case with a step motor to miss steps, especially at the start or finish of a step sequence. The encoder allows for position feedback control of any robot articulation, so that precise positioning is obtained. Such encoders are routinely used in industrial robots, therefore, the user of this modular robot will gain experience and gain understanding of encoders as employed in industrial robots.

The electronic controller module drives the various motors, end effector and interprets inputs from optical encoders, end effector, and other simple on/off type sensory input. The controller basically receives commands from a host computer and carries out the electronic manipulations of the robot's parts articulations.

I claim:

1. A modular, multi-configuration, educational robotics system having basic interchangeable component parts, comprising:

support surface means having a predetermined pattern and spacing of threaded holes therein;

an elongated modular rail means having a generally rectangular cross-section and including a substantially flat bottom mounting surface and a substantially flat top mounting surface, said top mounting surface extending over a shorter portion of said rail length than said bottom mounting surface and being centrally disposed so as to define fastening areas at the ends thereof for securing said rail means to said support surfaces means and further including attachment openings at predetermined locations thereon so that other rail means or other modular components may be secured to said top and bottom mounting surfaces;

a modular mounting block means which is a generally rectangularly shaped body having upper and lower mounting edges and side mounting edges and including opposed first and second surfaces, said body including a centrally disposed opening between said opposed first and second surfaces and further including a mounting slot opening located on each side of said centrally disposed opening, said mounting slot openings being generally parallel and extending over a predetermined portion of said body at right angles to said upper and lower mounting edges, said body further including threaded hole means at predetermined locations thereon for receiving securing means to attach the same to other component parts of said system;

modular first arm link means mounted for pivotal movement by one end on a shaft means supported between a pair of said block means and a modular second arm link means mounted for pivotal movement at the outer end of said first arm link means and adapted to receive an end effector means at its outer end; and power and drive transmission means at least partially attached to mounting block means on said support surface means for causing pivotal movement of said first and second arm links and predetermined types of movement to said end effector and including electronic controller means therefor.

2. The robotics system according to claim 1 and wherein said support surface means is a turret plate mounted for rotatable motion in a horizontal plane.

3. The robotics system according to claim 2 and wherein said turret plate is attached to and driven by support shaft means mounted on a base plate means which also includes a plurality and predetermined pattern of threaded holes therein.

4. The robotics system according to claim 3 and wherein said first and second arm links are U-shaped trough members with the open side of said U-shaped trough facing upwardly.

5. The robotics system according to claim 4 and in which said power and drive transmission means consists of a drive train combination of stepping motors, pulley and belts.

6. The robotics system according to claim 5 and wherein said first arm link is connected to a first pivot shaft supported between a pair of said mounting block means and wherein said first arm link is driven by a first stepper motor mounted on mounting block means and is connected by first power transmission means to said first shaft to rotate said first arm link.

7. The robotics system according to claim 6 and wherein said second arm link is mounted on second shaft means supported at the outer end of said first arm link, and wherein said second arm link is driven by a second stepper motor secured to mounting block means and is connected by second power transmission means to said second shaft to rotate said second arm link.

8. The robotics system according to claim 7 and wherein wrist connection means for an end effector is attached to the outer end of said second arm link whereby roll and pitch articulation motions may be transferred to said end effector.

9. The robotics system according to claim 8 and wherein a bevel gear differential is located at the outer end of said second link arm and whereby said bevel gear differential is driven by third and fourth power transmission means each including motor, belts and pulleys for imparting said roll and pitch articulation motions to said end effector through said wrist connection means.

10. The robotics system according to claim 1 and wherein said first and second arm links are U-shaped trough members with the open side of said U-shaped trough facing upwardly.

11. The robotics system according to claim 1 and in which said power and drive transmission means consists of a driven train combination of stepping motors, pulley and belts.

12. The robotics system according to claim 1 and wherein said first arm link is connected to a first pivot shaft supported between a pair of said mounting block means and wherein said first amr link is driven by a first stepper motor mounted on mounting block means and is connected by first power transmission means to said first shaft to rotate said first arm link.

13. The robotics system according to claim 12 and wherein said second arm link is mounted on second shaft means supported at the outer end of said first arm link, and wherein said second arm link is driven by a second stepper motor secured to mounting block means and is connected by second power transmission means to said second shaft to rotate said second arm link.

14. The robotics system according to claim 4 and wherein wrist connection means for an end effector is attached to the outer end of said second arm link whereby roll and pitch articulation motions may be transferred to said end effector.

15. The robotics system according to claim 14 and wherein a bevel gear differential is rotated at the outer end of said second link arm and whereby said bevel gear differential is driven by third and fourth power transmission means each including motor, belts and pulleys for imparting said roll and pitch articulation motions to said end effector through said wrist connection means.

16. The robotics system according to claim 1 and wherein bearing means are mounted in each of said pair of block means for supporting said shaft means for said first arm link.

17. The robotics system according to claim 1 and wherein optical encoder means is attached to at least one of said mounting block means for providing feedback control information to said electronic controller means.

* * * * *